United States Patent [19]

Freneix

[11] Patent Number: 5,297,917

[45] Date of Patent: Mar. 29, 1994

[54] METHOD OF ACTING REMOTELY IN A MINE SHAFT, IN PARTICULAR IN A SITE FOR DEEP STORAGE OF NUCLEAR WASTES

[75] Inventor: Gérard Freneix, St-Sebastien, France

[73] Assignee: ACB, Paris, France

[21] Appl. No.: 922,500

[22] Filed: Jul. 31, 1992

[30] Foreign Application Priority Data

Aug. 1, 1991 [FR] France ................. 91 09811

[51] Int. Cl.[5] .................... G21F 9/00; B66B 17/28
[52] U.S. Cl. ......................... 414/786; 246/30;
414/909; 414/146; 414/659; 414/611
[58] Field of Search ............ 414/146, 608, 609, 611,
414/659, 786, 909, 916, 918, 231; 246/29 R, 30,
14, 8, 187 A, 187 B, DIG. 1; 340/825.06

[56] References Cited

U.S. PATENT DOCUMENTS

| | | | |
|---|---|---|---|
| 2,478,133 | 8/1949 | Shanklin | 246/30 |
| 3,648,172 | 3/1972 | Nakahara et al. | 246/30 |
| 3,781,687 | 12/1973 | Nakamara et al. | 246/30 X |
| 3,871,302 | 5/1975 | Jamison et al. | 246/30 X |
| 3,940,577 | 2/1976 | Christofer | 414/146 X |
| 4,123,323 | 10/1978 | Weber et al. | 414/146 X |
| 4,279,563 | 7/1981 | Miller | 414/611 |
| 4,481,165 | 11/1984 | Anderson et al. | 414/146 X |
| 4,932,617 | 6/1990 | Heddebaut et al. | 246/8 |

FOREIGN PATENT DOCUMENTS

| | | |
|---|---|---|
| 0274055 | 7/1988 | European Pat. Off. . |
| 0355338 | 2/1990 | European Pat. Off. . |
| 759442 | 9/1980 | U.S.S.R. ................. 414/611 |

Primary Examiner—Michael S. Huppert
Assistant Examiner—Stephen Gordon
Attorney, Agent, or Firm—Sughrue, Mion, Zinn, Macpeak & Seas

[57] ABSTRACT

A method of remote control of a mobile carriage including at least one transmit and receive antenna for movement into an underground gallery connected to the surface by a shaft provided with an elevator for effecting deep storage of radioactive wastes. The method involves fitting the site with a plurality of waveguides from a control station which includes a signal generator and a signal receiver and being situated on the surface. The plurality of waveguides are disposed with at least one first waveguide at the surface extending from the control station to the entrance to the shaft. At least one second waveguide is disposed along the shaft and connected at its top end to the first waveguide. At least one third waveguide is disposed along the gallery and connected to the second waveguide in the vicinity of the entrance to the gallery. The waveguides are designed for remote tracking of the robot carriage and for controlling the elevator and at least one robot carriage carried by the elevator during vertical descent and ascent of the elevator within the shaft, and for controlling lateral movement of the robot carriage from the elevator into and within the gallery.

5 Claims, 2 Drawing Sheets

METHOD OF ACTING REMOTELY IN A MINE SHAFT, IN PARTICULAR IN A SITE FOR DEEP STORAGE OF NUCLEAR WASTES

The present invention relates to a method of acting remotely in an underground gallery connected to the surface by a shaft provided with a goods elevator, in particular for deep storage of radioactive wastes.

BACKGROUND OF THE INVENTION

At present, such wastes are stored on the surface, in buildings or containers that are sealed against ionizing radiation or that are buried beneath a protective layer.

Although such methods may seem satisfactory for materials of low radioactive activity and in the short term, they are unreasonable with certain substances of high activity, or with increasing masses of such substances.

One solution consists in storing radioactive wastes at depths of several kilometers.

French patent No. 2 608 119 describes apparatus for transmitting information and/or instructions over a wide passband and/or for location purposes between a mobile and a control station for the mobile, the apparatus comprising a hollow tube running parallel to the path followed by the mobile and forming a waveguide, the tube having an emitting face which is pierced with an array of openings for passing microwave electromagnetic radiation, the mobile being provided with at least one transmit and/or receive antenna for use with microwaves disposed facing the face of the tube that is pierced by the array of openings, the hollow tube being connected to at least one microwave feed member and to a member for receiving microwaves that come from the tube.

Such apparatus enables broadband analog information and/or high bit rate digital information to be interchanged, firstly such as telephone and/or video signals, and secondly such as telemetry and/or remote control signals, and it also allows position and/or speed measurements of the mobile to be performed as it moves close to the tube forming the microwave waveguide, which tube is referred to below as a "waveguide".

The present invention relates to a method of acting remotely in an underground shaft and/or gallery, in particular for storage of radioactive wastes, by using such waveguides for transmission and remote control purposes.

It might be possible to use freely-propagating radiowaves.

However, such transmission suffers from problems of interference, in particular with underground transmission where so-called "tunnel" effects can prevent proper transmission of waves between the transmitter and the receiver.

These problems are solved by the method of the invention.

SUMMARY OF THE INVENTION

The method of the invention consists in fitting the site with waveguides running from a control station which includes a signal generator and a signal receiver and which is situated on the surface, said waveguides being disposed:

as at least one first line at the surface running from the control station to the entrance to the shaft;

at least one second line disposed along the shaft and connected at its top end to the first line; and at least one third line disposed along the gallery and connected to the second line in the vicinity of the entrance to the gallery; and said waveguides being designed for tracking and/or remote controlling the elevator and at least one carriage for remote action.

BRIEF DESCRIPTION OF THE DRAWINGS

An embodiment of the invention is described by way of example with reference to the accompanying drawings, in which.

DETAILED DESCRIPTION

Figure 1:
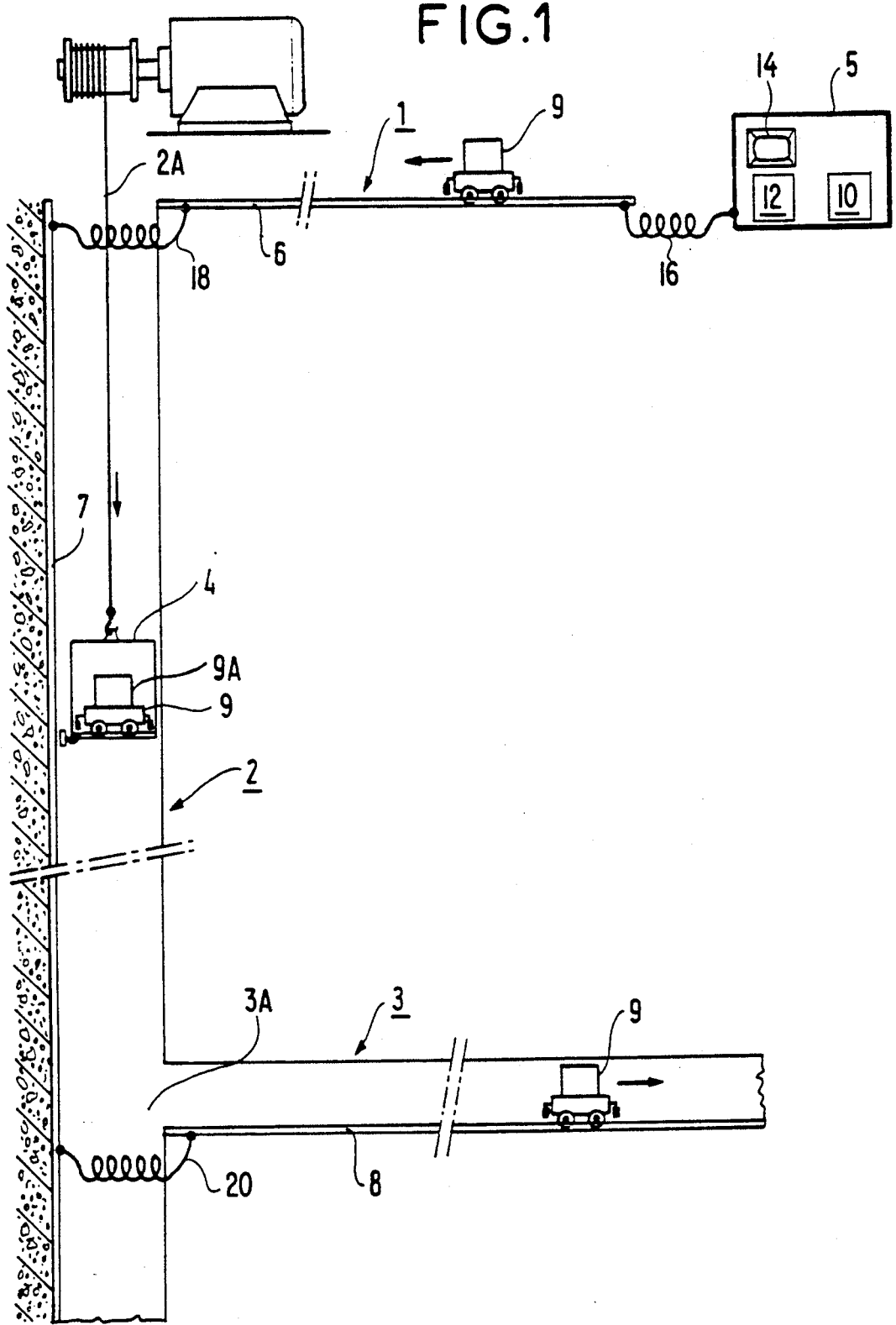
FIG. 1 is a diagrammatic view of a site fitted for implementing the method of the invention.

An undergound site, in particular for deep storage of radioactive wastes, comprises a shaft 2 connecting the surface 1 to a network of galleries 3 and fitted with an elevator 4.

In the vicinity of the entrance to the shaft 2 there is a control station 5. The control station includes a microwave generator 10 and a cabinet 12 for receiving signals. The cabinet is connected to one or more television screens 14 disposed in a control panel facing a workstation for monitoring purposes.

The control station 5 is connected by a coaxial cable 16 to a first waveguide line 6 connecting the control station 5 to the entrance 2A to the shaft 2.

The shaft 2 is fitted with a second waveguide line 7 that extends vertically and that is connected at its top end by means of a coaxial cable 18 to the first line 6. A third waveguide line 8 is installed in each gallery 3 and is connected via a respective coaxial cable 20 to the second line 7 in the vicinity of the entrance 3A to the gallery 3.

Figure 2:
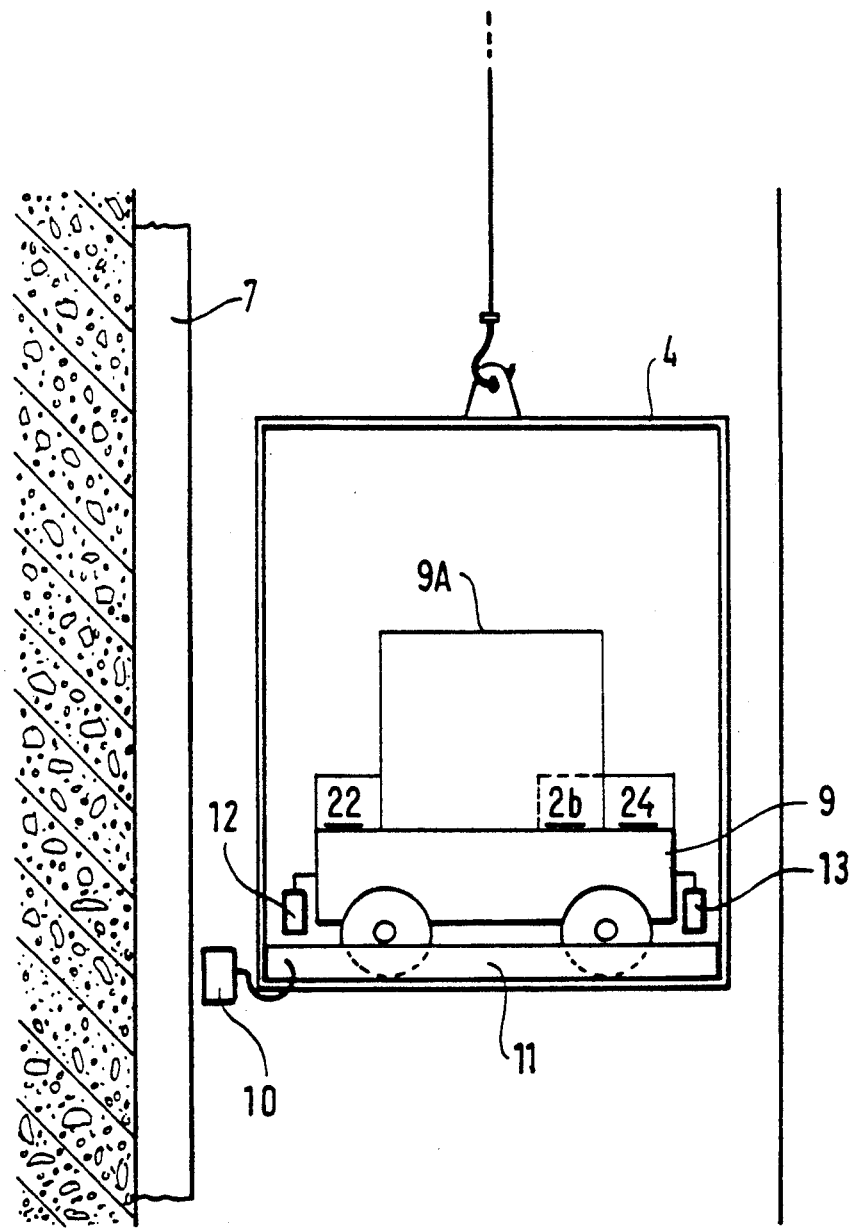
FIG. 2 is a diagrammatic view showing the elevator more particularly.

The elevator 4 is fitted with an antenna 10, FIG. 2, disposed facing the second line 7. This connection is used for remotely controlling and tracking the elevator 4 from the control station 5.

The elevator 4 also includes a waveguide 11 which is disposed in the example shown in the floor of the elevator. The waveguide 11 is connected to the antenna 10 of the elevator.

A robot carriage 9, possibly guided by rails, includes two antennas. One of the antennas 12, is disposed at the front of the carriage 9 while the other antenna, 13, is at the rear of the carriage. The antennas 12 and 13 are used for transmission between the carriage 9 and the control station 5 for tracking the carriage and for remotely controlling it:

via the first line 6 on the surface 1;

via the first line 6, the second line 7 and the waveguide 11 in the elevator when the carriage 9 is loaded in the elevator 4 and while the elevator is being lowered down the shaft; and via the first line 6, the second line 7, and the third line 8 when the carriage 9 is unloaded from the elevator 4 and while it is being caused to move along a gallery 3.

By having two antennas 12 and 13, it is possible to maintain continuous connection between the carriage and the control station when loading and moving the carriage 9 inside and outside the elevator. During the periods of discontinuity between the first line 6 and the waveguide 11 and between the waveguide 11 and the third guide 8, at least one of the antennas 12 or 13 is always facing a corresponding one of the waveguides.

In the elevator 4 and the gallery 3, the waveguides may be disposed on the floor, on the ceiling, or on the side walls, with the antennas 12 and 13 of the carriage 9 being disposed accordingly.

It is thus possible to track and control a plurality of carriages 9 simultaneously. The capacity for remote action can be further increased by multiplying the number of waveguides that are installed, and operating them in parallel.

The method of the invention is preferably intended for use in deep storage of radioactive wastes.

Under such circumstances, the carriage 9 is provided with means 9A for transporting radioactive loads and means 2b for discharging said loads in a gallery 3. Such means 9A and 2b are remotely controlled from the control station 5.

The carriage also includes a camera 22 providing a display at television screen 14 of the control station for control purposes.

The carriage may also include measurement means 24, in particular for measuring the temperature of nuclear loads which may increase because of their residual energy.

The invention serves to eliminate any mechanical connection or any connection involving friction between the remote control stations and the robot carriage while providing remote control signal transmission therebetween.

I claim:

1. A method for remote control of a mobile robot carriage in an underground gallery connected to the surface by a shaft provided with an elevator for carrying said mobile robot carriage during vertical ascent and descent of the elevator and permitting deep storage of radioactive waste, said method comprising: providing a plurality of waveguides running from a control station including a signal generator and a signal receiver and situated on a surface above the underground gallery by disposing:
   at least one first waveguide at said surface extending from the control station to an entrance to the shaft;
   at least one second waveguide along the shaft and connected at a top end of paid record waveguide to the first waveguide;
   and at least one third waveguide along the gallery and connected to the second waveguide in the vicinity of an entrance to the gallery; and wherein
   said method further comprises transmitting control signals from said control station at said surface, to said robot carriage for controlling movement of the robot carriage from said control station;
   said control signals travelling via said first waveguide during travel of the robot carriage over the surface;
   said control signals travelling via said first waveguide and said second waveguide during loading of the robot carriage into the elevator and during lowering of the robot carriage down the shaft by descent of the elevator; and,
   said control signals travelling via said first waveguide, said second waveguide and said third waveguide during unloading of the robot carriage from the elevator at a level of the gallery and during movement of the robot carriage along the gallery.

2. A method according to claim 1, wherein said elevator is fitted with an antenna providing a signal connection between the second
   waveguide and said elevator; and
   said elevator is further fitted with a waveguide for providing a signal connection between said elevator and said carriage during carriage transport by the elevator, wherein said method further comprises the step of controlling the movement of the robot carriage from the elevator into the entrance to the gallery after the vertical descent of the elevator from the surface to the level of the gallery.

3. A method according to claim 2, wherein said robot carriage includes a front antenna and a rear antenna each carriage antenna providing signal connections between the carriage and the first waveguide or the third waveguide.

4. A method according to claim 1, wherein the carriage further comprises means for transporting radioactive loads, and means for discharging said radioactive loads in the gallery, and said method further comprises;
   transmitting control signals from said control station at said surface to said robot carriage within said gallery for controlling transport of the radioactive loads along said gallery.

5. A method according to claim 4, wherein the carriage further includes an antenna for receiving and transmitting signals between the carriage and the control station, said carriage further comprises means for measuring the temperature of loads within said load transporting means.

* * * * *